(12) United States Patent
Srinivasan et al.

(10) Patent No.: US 11,090,770 B2
(45) Date of Patent: Aug. 17, 2021

(54) METHOD OF FORMING A COMPONENT

(71) Applicant: GENERAL ELECTRIC COMPANY, Schenectady, NY (US)

(72) Inventors: Dheepa Srinivasan, Karnataka (IN); Dayananda Narayana, Karnataka (IN); Kaustubh Krishna Bawane, Karnataka (IN); Joydeep Pal, Karnataka (IN); Mariusz Strzyzewski, Mazovian (PL); Tomasz Szewczyk, Mazovian (PL); David Edward Schick, Greenville, SC (US)

(73) Assignee: General Electric Company, Schenectady, NY (US)

(*) Notice: Subject to any disclaimer, the term of this patent is extended or adjusted under 35 U.S.C. 154(b) by 183 days.

(21) Appl. No.: 16/302,490

(22) PCT Filed: May 18, 2016

(86) PCT No.: PCT/PL2016/050020
§ 371 (c)(1),
(2) Date: Nov. 16, 2018

(87) PCT Pub. No.: WO2017/200401
PCT Pub. Date: Nov. 23, 2017

(65) Prior Publication Data
US 2019/0176273 A1 Jun. 13, 2019

(51) Int. Cl.
*B23P 6/00* (2006.01)
*B22F 5/04* (2006.01)
(Continued)

(52) U.S. Cl.
CPC ............... *B23P 6/007* (2013.01); *B22F 5/04* (2013.01); *B22F 7/062* (2013.01); *B22F 7/08* (2013.01);
(Continued)

(58) Field of Classification Search
CPC ........ B23P 6/007; B23P 6/005; B22F 3/1055; B22F 5/04; B22F 7/062; B22F 7/08;
(Continued)

(56) References Cited

U.S. PATENT DOCUMENTS 5,697,151 A 12/1997 Werner et al.
5,705,117 A 1/1998 O'Conner et al.
(Continued)

FOREIGN PATENT DOCUMENTS

EP 2317075 5/2011
EP 2495397 A2 9/2012
EP 2777867 A1 9/2014

OTHER PUBLICATIONS

Drew Robb: "Print That Turminel: 3D Printing Opens the Door to Rapid Turbine Development, More Complex Blade Design and Faster Part Replacement", Turbomachinery International May/Jun. 2015.
(Continued)

Primary Examiner — Rick K Chang
(74) Attorney, Agent, or Firm — James Pemrick; Hoffman Warnick LLC

(57) ABSTRACT

A component and method of forming a component are disclosed. The component includes a cast alloy section and an additive manufacturing section secured to the cast alloy section. Both the cast alloy section and the additive manufacturing section form at least a portion of an outer surface of the component. The method of forming a component includes removing a portion of an existing component, the removing of the portion forming an open section in the existing component, forming an article through an additive manufacturing technique, the article having a shape and geometry arranged and disposed to fill the open section in the existing component, and securing the article within the open section of the existing component to form the compo-
(Continued)

nent. Another method includes directly depositing a material, by an additive manufacturing technique, over a portion of the existing component.

11 Claims, 6 Drawing Sheets

(51) Int. Cl.
| | | |
|---|---|---|
| *F01D 5/00* | (2006.01) | |
| *F01D 5/18* | (2006.01) | |
| *B23K 26/342* | (2014.01) | |
| *B22F 7/06* | (2006.01) | |
| *B22F 7/08* | (2006.01) | |
| *B23K 26/14* | (2014.01) | |
| *B23K 26/144* | (2014.01) | |
| *B22F 10/20* | (2021.01) | |
| *B23K 101/00* | (2006.01) | |
| *B23K 103/18* | (2006.01) | |

(52) U.S. Cl.
CPC ............ *B22F 10/20* (2021.01); *B23K 26/144* (2015.10); *B23K 26/1464* (2013.01); *B23K 26/1476* (2013.01); *B23K 26/342* (2015.10); *B23P 6/005* (2013.01); *F01D 5/005* (2013.01); *F01D 5/186* (2013.01); *F01D 5/187* (2013.01); *B22F 2007/068* (2013.01); *B23K 2101/001* (2018.08); *B23K 2103/26* (2018.08); *F05D 2230/22* (2013.01); *F05D 2230/234* (2013.01); *F05D 2230/236* (2013.01); *F05D 2230/237* (2013.01); *F05D 2230/31* (2013.01); *F05D 2230/51* (2013.01); *F05D 2230/80* (2013.01); *F05D 2240/122* (2013.01); *F05D 2240/304* (2013.01); *F05D 2260/202* (2013.01); *Y02P 10/25* (2015.11)

(58) Field of Classification Search
CPC .... B22F 2007/068; F01D 5/005; F01D 5/186; F01D 5/187; Y02P 10/25; B23K 2101/001; B23K 2103/26; B23K 26/1476; B23K 26/144; B23K 26/1464; B23K 26/342; F05D 2230/22; F05D 2230/234; F05D 2230/80; F05D 2240/122; F05D 2240/304; F05D 2260/202; F05D 2230/237; F05D 2230/31; F05D 2230/51; F05D 2230/236
See application file for complete search history.

(56) References Cited

U.S. PATENT DOCUMENTS

| | | | |
|---|---|---|---|
| 6,600,965 | B1 | 7/2003 | Hull et al. |
| 6,665,574 | B2 | 12/2003 | Farren |
| 2002/0148817 | A1 | 10/2002 | Tewari |
| 2007/0084047 | A1 | 4/2007 | Lange et al. |
| 2009/0255981 | A1 | 10/2009 | Singer et al. |
| 2010/0008816 | A1 | 1/2010 | Hu |
| 2011/0099810 | A1 | 5/2011 | Stankowski et al. |
| 2013/0108460 | A1 | 5/2013 | Szwedowicz et al. |
| 2013/0323533 | A1 | 12/2013 | Cui et al. |
| 2014/0161618 | A1* | 6/2014 | Walker ................... F01D 5/005 416/223 A |
| 2017/0274476 | A1* | 9/2017 | Mazumder ........... B23K 26/702 |

OTHER PUBLICATIONS

International Search Report and Written Opinion dated Feb. 6, 2017 which was issued in connection with PCT application No. PCT/PL2016/050020 which was filed on May 18, 2016.

* cited by examiner

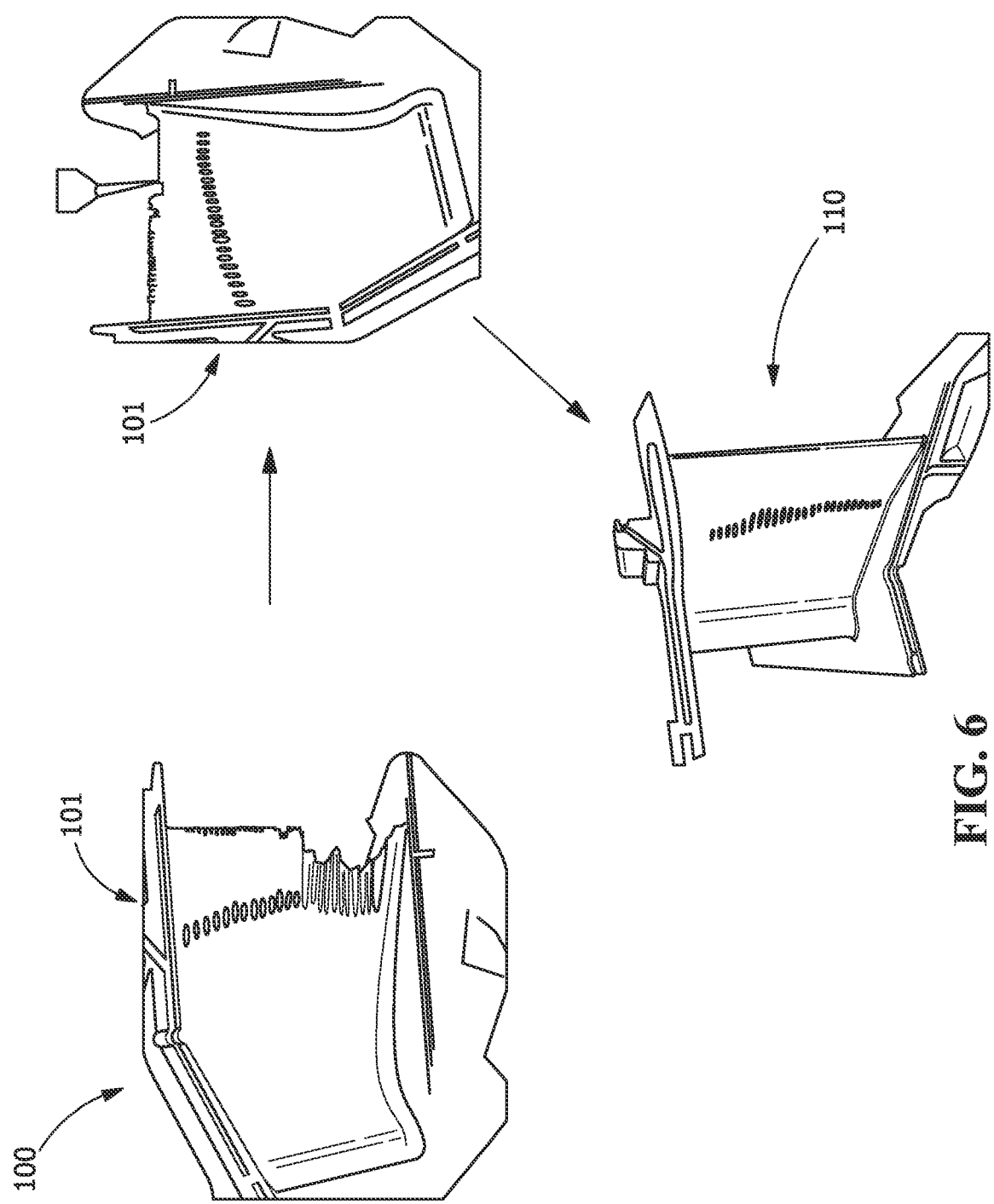

METHOD OF FORMING A COMPONENT

FIELD OF THE INVENTION

The present invention is directed to a component and a method of forming a component. More particularly, the present invention is directed to a component including a printed article and a method of forming a component including a printed article.

BACKGROUND OF THE INVENTION

Gas turbines include components, such as buckets (blades), nozzles (vanes), combustors, shrouds, and other hot gas path components that are exposed to extreme temperatures, chemical environments, and physical conditions during operation of the gas turbines. These components are generally serviced at various points throughout their life cycle. Often, due to the operating conditions within the gas turbines, the servicing of the components includes removing and/or replacing a portion of the component.

For example, the servicing may include removing and replacing a bond coating and/or thermal barrier coating that was formed over the component during manufacturing. The servicing may also include removing and/or replacing portions of the substrate that form the component. However, the removing and replacing of portions of the substrate usually includes processing and/or post processing treatment of the serviced component, which is costly, time consuming, and increases down time for the gas turbine during servicing.

Additionally, when the portion of the component being removed is relatively large, replacing the removed portion may include welding a cast segment onto the component. This welding of the cast segment frequently results in distortion of the component, which is then reworked prior to being returned to service. The forming of the cast segment, processing of the serviced component, and reworking of the component is both expensive and time consuming. While alternatively replacing the existing component with a new component may decrease service time, it also increases cost, increases component scrapping, and/or decreases component life cycle.

BRIEF DESCRIPTION OF THE INVENTION

In an exemplary embodiment, a method of forming a component includes removing a portion of an existing component, the removing of the portion forming an open section in the existing component, forming an article through an additive manufacturing technique, the article having a shape and geometry arranged and disposed to fill the open section in the existing component, and securing the article within the open section of the existing component to form the component.

In another exemplary embodiment, a method of forming a component includes positioning an existing component in an additive manufacturing arrangement, depositing a material, by an additive manufacturing technique, over a portion of the existing component, and forming a feature from the material over the portion of the existing component, the feature providing a shape and geometry of the component.

In another exemplary embodiment, a component includes a cast alloy section and an additive manufacturing section secured to the cast alloy section. Both the cast alloy section and the additive manufacturing section form at least a portion of an outer surface of the component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6 is a process view of a method of forming a component, according to an embodiment of the disclosure.

Wherever possible, the same reference numbers will be used throughout the drawings to represent the same parts.

DETAILED DESCRIPTION OF THE INVENTION

Provided are exemplary components and methods of forming components. Embodiments of the present disclosure, in comparison to processes and articles not using one or more of the features described herein, decrease scrapping of used components, increase component life, permit replacing larger portions of a component, decrease or eliminate welding during the forming of the component, decrease system down time, increase efficiency of component formation, decrease or eliminate formation of heat affected zones, decrease cost of component formation, decrease or eliminate post-formation processing of the component, permit modification of component composition, decrease or eliminate distortion of the component, increase reliability of component formation, or a combination thereof.

Figure 1:
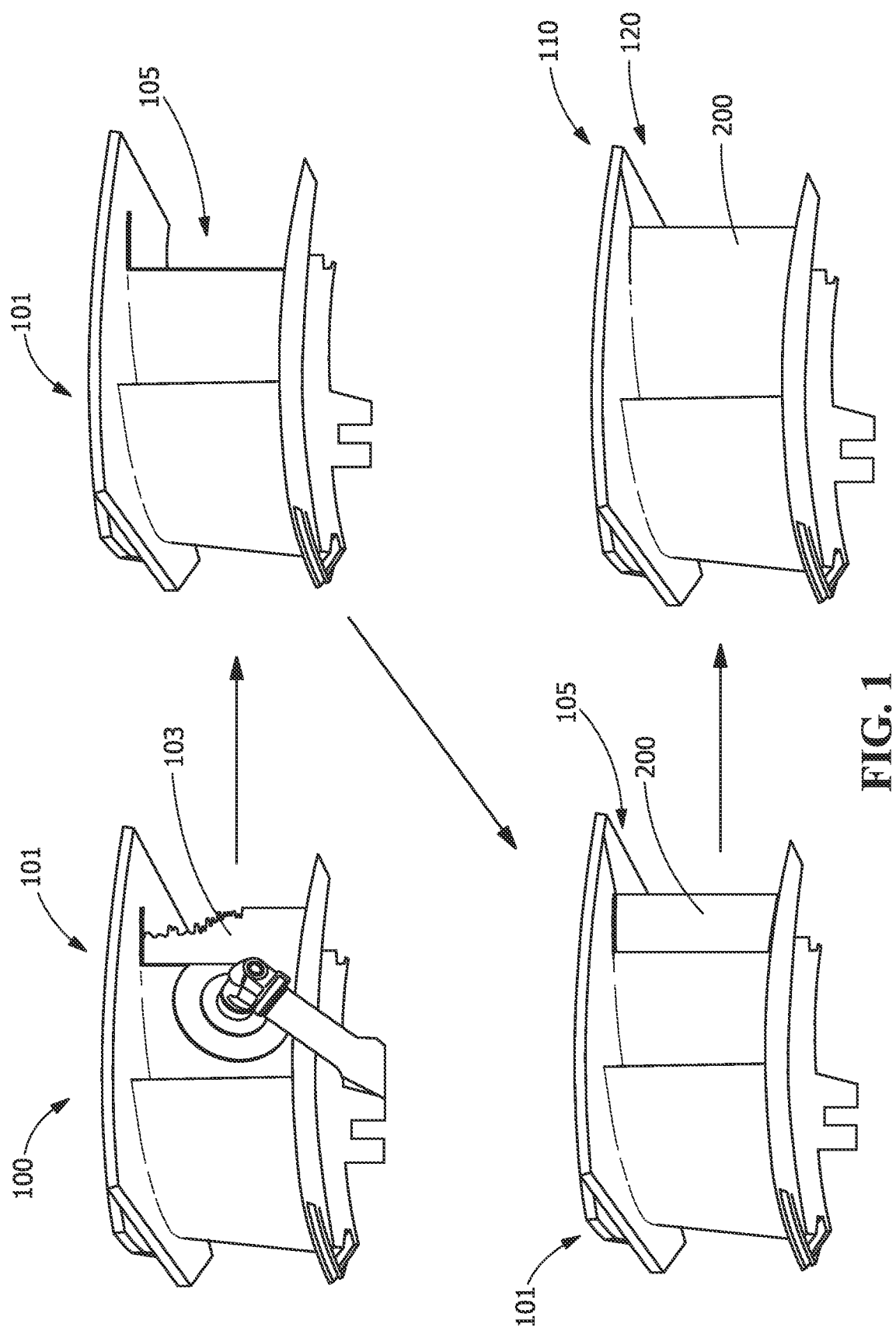
FIG. 1 is a process view of a method of forming a component, according to an embodiment of the disclosure.

Referring to FIG. 1, in one embodiment, a method 100 of forming a component 110 includes removing a portion 103 of an existing component 101 to form an open section 105 in the existing component 101, forming an article 200 having a shape and geometry configured to fill the open section 105 in the existing component 101, and securing the article 200 within the open section 105 of the existing component 101 to form the component 110. The component 110 includes any suitable component for having the article 200 secured thereto. One suitable component includes a gas turbine component, such as, but not limited to, a nozzle, a blade, a bucket, a vane, a shroud, a combustor, any other hot gas path component, or a combination thereof. For example, as illustrated in FIG. 1, the component 110 may include a nozzle 120 of a gas turbine.

Figure 2:
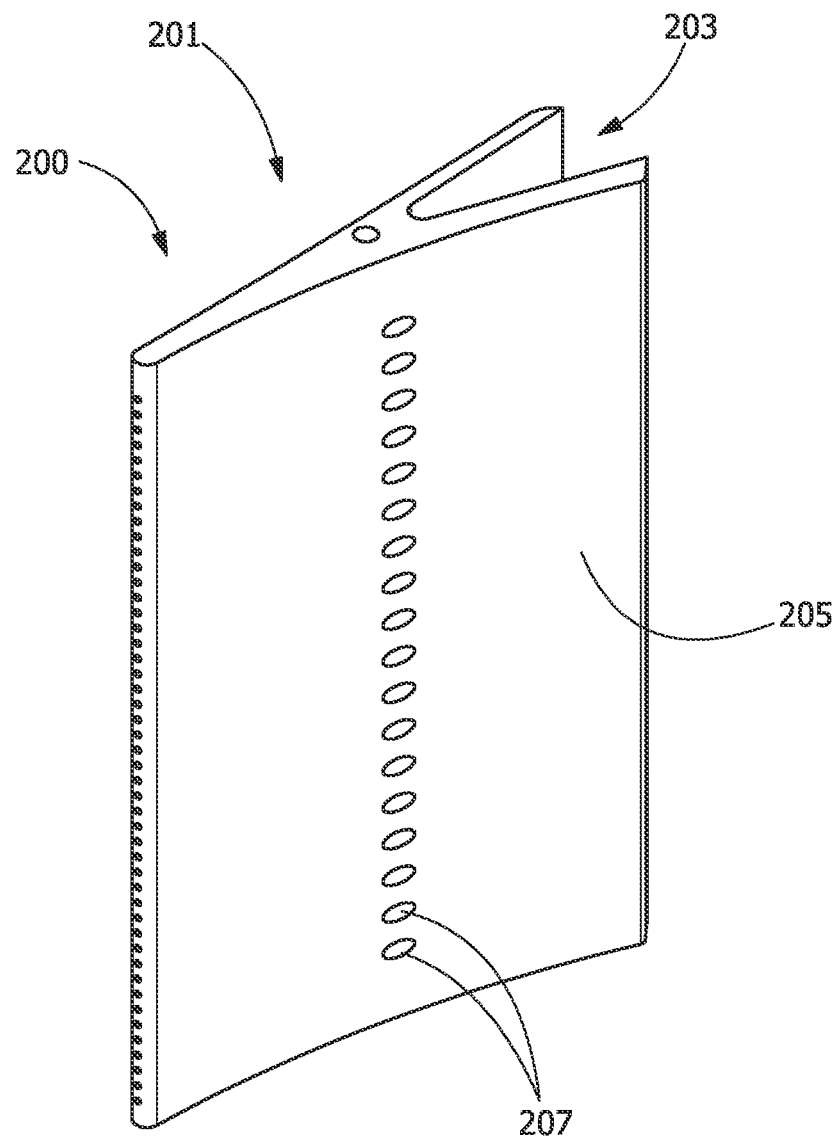
FIG. 2 is a perspective view of an article, according to an embodiment of the disclosure.

Turning to FIG. 2, the article 200 includes any suitable shape and/or geometry configured to fill the open section 105 in the existing component 101. For example, in one embodiment, the article 200 includes the shape of a trailing edge portion 201. The trailing edge portion 201 includes a segment of an internal cavity 203, a shaped outer surface 205, and at least one cooling hole 207 formed therein. In another embodiment, the trailing edge portion 201 is secured within the open section 105 of the existing component 101 to form the nozzle 120 (see FIG. 1). In a further embodiment, the securing of the article 200, such as the trailing edge portion 201, forms the component 110 without any post-securing processing and/or post-processing heat treatment.

According to one or more of the embodiments described herein, the article 200 is formed through an additive manufacturing process. The additive manufacturing technique forms net or near-net shape structures through sequentially and repeatedly depositing and joining material layers. As used herein "near-net shape" means that the article 200 is formed very close to the final shape of the article 200, not requiring significant traditional mechanical finishing techniques such as machining or grinding following the additive manufacturing. As used herein "net shape" means that the article 200 is formed with the final shape of the article 200, not requiring any traditional mechanical finishing techniques such as machining or grinding following the additive manufacturing. Suitable additive manufacturing processes include, but are not limited to, the processes known to those of ordinary skill in the art as Direct Metal Laser Melting (DMLM), Direct Metal Laser Sintering (DMLS), Direct Metal Laser Deposition (DMLD), Laser Engineered Net Shaping (LENS), Selective Laser Sintering (SLS), Selective Laser Melting (SLM), Electron Beam Melting (EBM), Fused Deposition Modeling (FDM), or a combination thereof.

Figure 3:
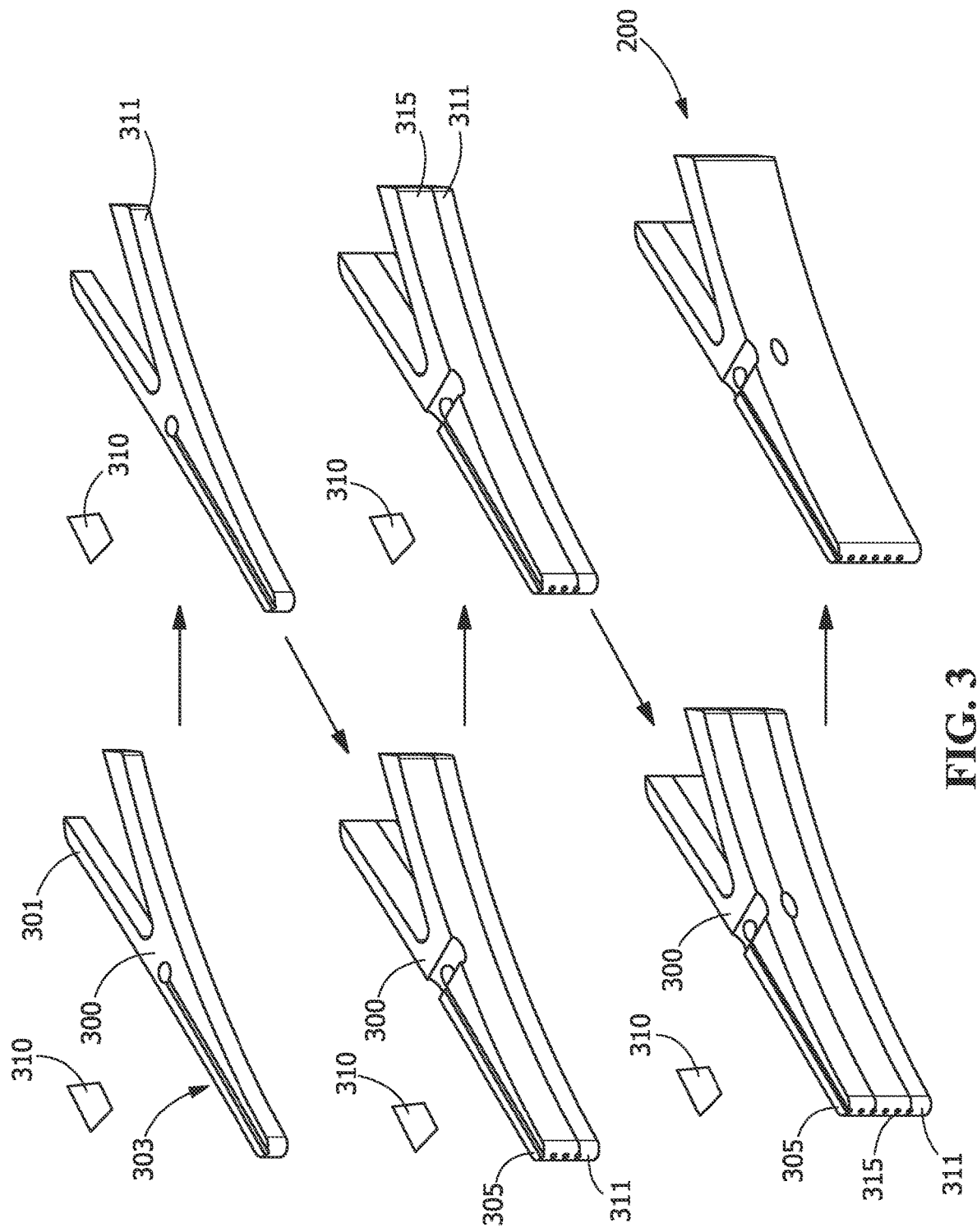
FIG. 3 is a process view of a method of forming the article of FIG. 2, according to an embodiment of the disclosure.

For example, in one embodiment, as illustrated in FIG. 3, the DMLM process for forming the article 200 includes distributing a first layer 301 of a powder material 300 to a selected region 303, selectively laser melting the powder material 300 of the first layer 301 to form a first sheet 311, distributing at least one additional layer 305 of the powder material 300 over the first sheet 311, and selectively laser melting the powder material 300 of each of the at least one additional layers 305 to form at least one additional sheet 315. The selective laser melting of the first layer 301 and the at least one additional layer 305 joins the first layer 301 and the at least one additional layer 305, forming the article 200 having the shape and geometry configured to fill the open section 105 of the existing component 101. In another embodiment, the DMLM process is performed in an inert gas atmosphere and/or under gas shielding. In a further embodiment, the selective laser melting of the DMLM process is performed with any suitable focused energy source 310.

Suitable focused energy sources include, but are not limited to, laser device, an electron beam device, or a combination thereof. The laser device includes any laser device operating in a power range and travel speed for melting the powder material 300, such as, but not limited to, a fiber laser, a $CO_2$ laser, or a ND-YAG laser. In one embodiment, the power range includes, but is not limited to, between 125 and 500 watts, between 150 and 500 watts, between 150 and 400 watts, or any combination, sub-combination, range, or sub-range thereof. In another embodiment, the travel speed includes, but is not limited to, between 400 and 1200 mm/sec, between 500 and 1200 mm/sec, between 500 and 1000 mm/sec, or any combination, sub-combination, range, or sub-range thereof. For example, in a further embodiment, the focused energy source 310 operates in the power range of between 125 and 500 watts, at the travel speed of between 400 and 1200 mm/sec for one to three contour passes. In another embodiment, the focused energy source 310 includes a hatch spacing of between about 0.08 mm and 0.2 mm.

In certain embodiments, after selectively laser melting the first layer and the at least one additional layer 305, the article 200 undergoes post-processing treatment. The post-processing treatment of the article 200 formed through the DMLM process includes any suitable post-processing technique, such as, but not limited to, hot isostatic pressing (HIP'ing), solution heat treating (solutionizing), and/or stress relieving. For example, in one embodiment, the article 200 is hot isostatic pressed (HIP'd) for 3-5 hours at an elevated temperature of between 1149° C. and 1260° C. (2100° F. and 2300° F.), and an elevated pressure of between 68.95 MPa and 137.9 MPa (10,000 PSI and 20,000 PSI). The HIP'ing further consolidates the article 200 to increase the density of the article 200 from, for example, between about 98% and 100% to between about 99.5% and 99.8%. In a further embodiment, in addition to HIP'ing, the article 200 may be solution heat treated (solutionized) for 1-2 hours in vacuum at an elevated temperature of between 1093° C. and 1205° C. (2000° F. and 2200° F.). The elevated temperature includes any temperature sufficient for distributing segregated alloying elements within the article 200. In another embodiment, the article 200 is heat treated for 1-3 hours in vacuum at an elevated temperature of between 1038° C. and 1149° C. (1900° F. and 2100° F.). It will be recognized by those skilled in the art that HIP'ing temperatures and heat treat temperatures will be highly dependent on the composition of the powder material 300 and the desired properties.

Figure 4:
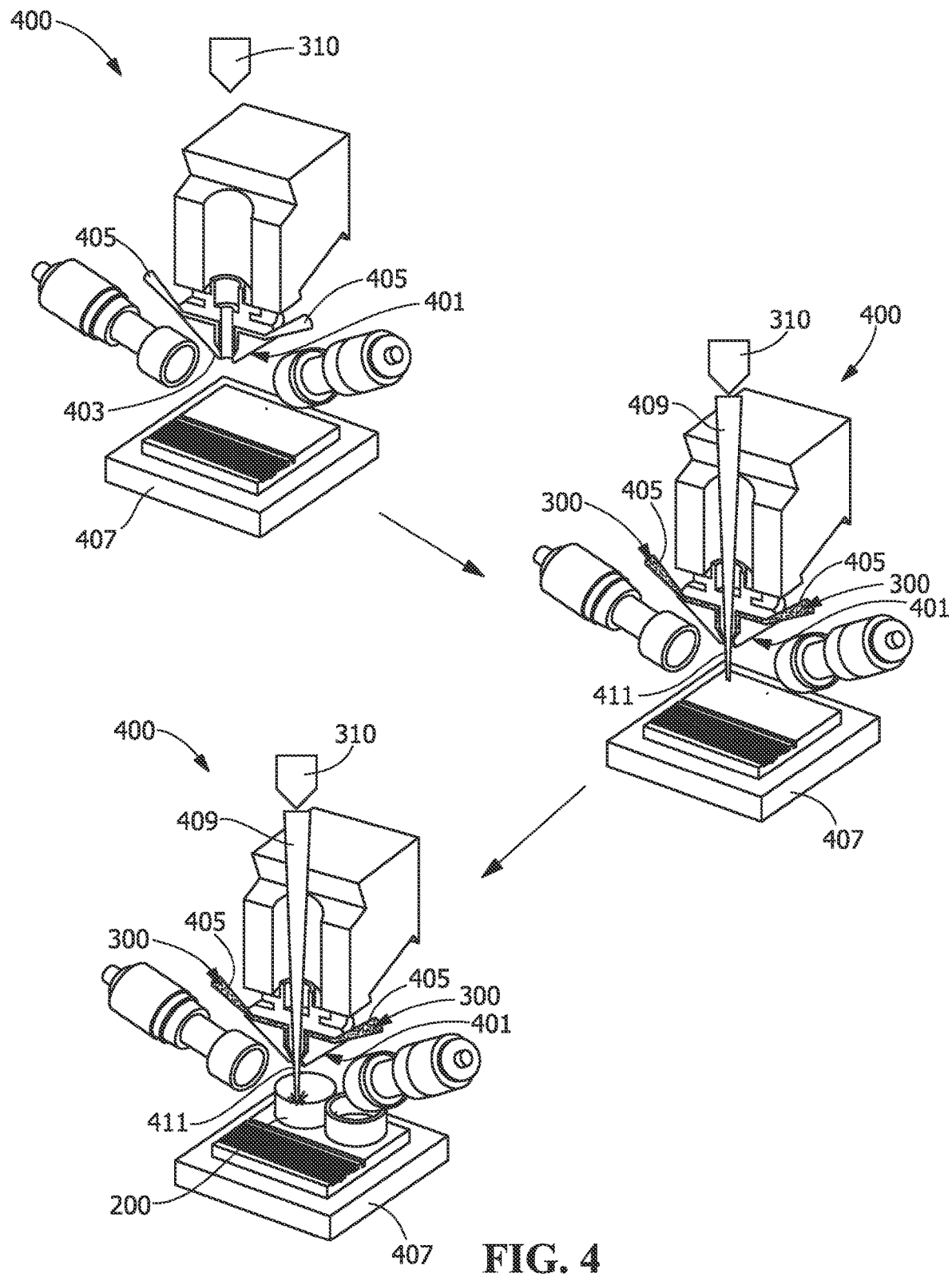
FIG. 4 is a process view of a method of forming the article of FIG. 2, according to an alternate embodiment of the disclosure.

Referring to FIG. 4, in another example, the DMLD process is performed with a powder deposition assembly 400, which includes a powder delivery assembly 401 and the focused energy source 310. The powder delivery assembly 401 includes one or more nozzles 403 and one or more material feeders 405. During the DMLD process, the one or more material feeders 405 deliver the powder material 300 and/or any other material to the one or more nozzles 403, which direct the powder material 300 towards a platform 407. The focused energy source 310 concurrently directs a focused energy beam 409 through the one or more nozzles 403, forming a gas atomized powder material 411 existing the one or more nozzles 403. Next, the DMLD process includes directing the gas atomized powder material 411 towards the platform 407, and depositing the gas atomized powder material 411 on the platform 407.

During the directing of the powder material 300 and the focused energy beam 409, the DMLD process includes moving at least one of the nozzle 403 and the platform 407 relative to each other, the moving providing the shape and geometry of the article 200. To provide relative movement, the platform 407 may be fixed and the powder deposition assembly 400 may be moved, the powder deposition assembly 400 may be fixed and the platform 407 may be moved, or both the powder deposition assembly 400 and the platform 407 may be moved independently of each other. For example, in one embodiment, the platform 407 includes three or more axes of rotation for moving relative to the powder deposition assembly 400. In another embodiment, movement of the platform 407 and/or the powder deposition assembly 400 is controlled by software configured to automate the process and/or form the article 200 based upon a computer-aided design (CAD) model. In a further embodiment, closed loop controls provide increased control over microstructure and material properties.

The relative movement of the platform 407 and/or the powder deposition assembly 400 during the DMLD process provides a dimensional accuracy of at least 0.001 inches, at least 0.005 inches, at least 0.01 inches, between 0.001 and 0.01 inches, between 0.001 and 0.005 inches, or any combination, sub-combination, range, or sub-range thereof. Additionally, the DMLD process provides a fully dense metal in the article 200 formed therefrom. Furthermore, the DMLD process provides heterogeneous material fabrication, homogeneous material fabrication, control over external geometry, control over internal geometry, or a combination thereof.

The one or more material feeders 405 and/or the one or more nozzles 403 are configured to provide any suitable composition of the atomized powder material 411. Suitable compositions include, but are not limited to, similar or substantially similar compositions between layers, differing compositions between layers, gradient compositions within the article 200, or a combination thereof. For example, gradient compositions within the article 200 may be formed by varying flow rate and/or compositions between material feeders 405, varying compositions within the feeders 405, or a combination thereof. In one embodiment, the flow rate for the powder material 300 includes, for example, up to 5 g/min, between 0.1 and 5 g/min, between 0.5 and 4.5 g/min, or any combination, sub-combination, range, or sub-range thereof. In another embodiment, the directing of the focused energy beam 409 and the powder material 300 is shielded by a shielding gas such as argon. Suitable shielding gas flow rates, include, but are not limited to, between 1 and 15 l/min, between 2 and 10 l/min, or any combination, sub-combination, range, or sub-range thereof.

Suitable focused energy sources 310 for the DMLD process include any focused energy source 310 operating in a power range and travel speed for depositing the atomized powder material 411. In one embodiment, the power range of the focused energy source 310 in the DMLD process includes, but is not limited to, between 100 and 3,000 watts, between 200 and 2,500 watts, between 300 and 2,000 watts, or any combination, sub-combination, range, or sub-range thereof. In another embodiment, the travel speed includes, but is not limited to, up to 300 mm/sec, between 1 and 300 mm/sec, between 4 and 250 mm/sec, or any combination, sub-combination, range, or sub-range thereof. For example, in a further embodiment, the focused energy source 310 operates in the power range of between 300 and 2,000 watts, at the travel speed of between 4 and 250 mm/sec. In another embodiment, a deposition rate for standard steels, titanium, and/or nickel alloys includes, for example, up to 1 kg/hour, up to 0.75 kg/hr, up to 0.5 kg/hour, between 0.1 and 0.5 kg/hour, up to 0.4 kg/hour, up to 0.3 kg/hour, or any combination, sub-combination, range, or sub-range thereof.

After forming the article 200, the securing of the article 200 to the open section 105 of the existing component 101 includes any suitable metal and/or alloy joining process, such as, but not limited to, brazing, welding, diffusion bonding, or a combination thereof. As will be appreciated by those skilled in the art, the process for joining the article 200 to the existing component 101 may be selected based upon the composition of the existing component 101 and/or the article 200. Compositions of the existing component 101 include any suitable material for continuous use in a turbine engine and/or within the hot gas path of the turbine engine. Suitable materials of the existing component 101 include, but are not limited to, a metal, a ceramic, an alloy, a superalloy, steel, a stainless steel, a tool steel, nickel, cobalt, chrome, titanium, aluminum, or a combination thereof.

For example, in one embodiment, the material of the existing component 101 is a cobalt-based material including, but not limited to, a composition, by weight, of about 29% chromium (Cr), about 10% nickel (Ni), about 7% tungsten (W), about 1% iron (Fe), about 0.7% Manganese (Mn), about 0.75% Silicon (Si), about 0.25% carbon (C), about 0.01% boron (B), and balance cobalt (Co) (e.g., FSX414); about 20% to about 24% Cr, about 20% to about 24% Ni, about 13% to about 15% W, about 3% Fe, about 1.25% manganese (Mn), about 0.2% to about 0.5% silicon (Si), about 0.015% B, about 0.05% to about 0.15% C, about 0.02% to about 0.12% lanthium (La), and balance Co (e.g., HAYNES® 188); about 22.5% to about 24.25% Cr, about 9% to about 11% Ni, about 6.5% to about 7.5% W, about 3% to about 4% Ta, up to about 0.3% titanium (Ti) (e.g., about 0.15% to about 0.3% Ti), up to about 0.65% C (e.g., about 0.55% to about 0.65% C), up to about 0.55% zirconium (Zr) (e.g., about 0.45% to about 0.55% Zr), and balance Co (e.g., Mar-M-509); about 20% Ni, about 20% Cr, about 7.5% Ta, about 0.1% Zr, about 0.05% C, and balance Co (e.g., Mar-M-918).

In another embodiment, the material of the existing component 101 is a nickel-based material including, but not limited to, a composition, by weight, of about 9.75% Cr, about 7.5% Co, about 6.0% W, about 4.2% aluminum (Al), about 3.5% Ti, about 1.5% molybdenum (Mo), about 4.8% Ta, about 0.5% niobium (Nb), about 0.15% hafnium (Hf), about 0.05% C, about 0.004% B, and a balance of Ni (e.g., René N4); about 7.5% Co, about 7.0% Cr, about 6.5% Ta, about 6.2% Al, about 5.0% W, about 3.0% rhenium (Re), about 1.5% Mo, about 0.15% Hf, about 0.05% C, about 0.004% B, about 0.01% yttrium (Y), and a balance of Ni (e.g., René N5); between about 9% and about 10% Co, between about 9.3% and about 9.7% W, between about 8.0% and about 8.7% Cr, between about 5.25% and about 5.75% Al, between about 2.8% and about 3.3% Ta, between about 1.3% and about 1.7% Hf, up to about 0.9% Ti (for example, between about 0.6% and about 0.9%), up to about 0.6% Mo (for example, between about 0.4% and about 0.6%), up to about 0.2% Fe, up to about 0.12% Si, up to about 0.1% Mn, up to about 0.1% copper (Cu), up to about 0.1% C (for example, between about 0.07% and about 0.1%), up to about 0.1% Nb, up to about 0.02% Zr (for example, between about 0.005% and about 0.02%), up to about 0.02% B (for example, between about 0.01% and about 0.02%), up to about 0.01% phosphorus (P), up to about 0.004% sulfur (S), and a balance of Ni (e.g., René 108); about 13.70% to about 14.30% Cr, about 9.0% to about 10.0% Co, about 4.7% to about 5.1% Ti, about 3.5% to about 4.1% W, about 2.8% to about 3.2% Al, about 2.4% to about 3.1% Ta, about 1.4% to about 1.7% Mo, 0.35% Fe, 0.3% Si, about 0.15% Nb, about 0.08% to about 0.12% C, about 0.1% Mn, about 0.1% Cu, about 0.04% Zr, about 0.005% to about 0.020% B, about 0.015% P, about 0.005% S, and a balance of Ni (e.g., GTD-111®, available from General Electric Company); about 22.2 to about 22.8% Cr, about 18.5 to about 19.5% Co, about 2.3% Ti, about 1.8 to about 2.2% W, about 1.2% Al, about 1.0% Ta, about 0.8% Nb, about 0.25% Si, about 0.08 to about 0.12% C, about 0.10% Mn, about 0.05% Zr, about 0.008% B, and balance Ni (e.g., GTD-222®, available from General Electric Company); about 9.75% Cr, about 7.5% Co, about 6.0% W, about 4.2% Al, about 4.8% Ta, about 3.5% Ti, about 1.5% Mo, about 0.08% C, about 0.009% Zr, about 0.009% B, and a balance of Ni (e.g., GTD-444®, available from General Electric Company); about 15.70% to about 16.30% Cr, about 8.00% to about 9.00% Co, about 3.20% to about 3.70% Ti, about 3.20% to about 3.70% Al, about 2.40% to about 2.80% W, about 1.50% to about 2.00% Ta, about 1.50% to about 2.00% Mo, about 0.60% to about 1.10% Nb, up to about 0.50% Fe, up to about 0.30% Si, up to about 0.20% Mn, about 0.15% to about 0.20% C, about 0.05% to about 0.15% Zr, up to about 0.015% S, about 0.005% to about 0.015% B, and a balance nickel (e.g., INCONEL® 738); about 9.3% to about 9.7% W, about 9.0% to about 9.5% Co, about 8.0% to about 8.5% Cr, about 5.4% to about 5.7% Al, up to about 0.25% Si, up to about 0.1% Mn, about 0.06% to about 0.09% C, incidental impurities, and a balance Ni (e.g., Mar-M-247).

In a further embodiment, the material of the existing component 101 is an iron-based material including, but not limited to, a composition, by weight, of about 50% to about 55% nickel and cobalt combined, about 17% to about 21% chromium, about 4.75% to about 5.50% niobium and tantalum combined, about 0.08% carbon, about 0.35% manganese, about 0.35% silicon, about 0.015% phosphorus, about 0.015% sulfur, about 1.0% cobalt, about 0.35% to 0.80% aluminum, about 2.80% to about 3.30% molybdenum, about 0.65% to about 1.15% titanium, about 0.001% to about 0.006% boron, about 0.15% copper, and balance of iron (e.g., INCONEL® 718). Other materials of the existing component 101 include, but are not limited to, a CoCrMo alloy, such as, for example, 70Co-27Cr-3Mo; a ceramic matrix composite (CMC), or a combination thereof.

"INCONEL" is a federally registered trademark of alloys produced by Huntington Alloys Corporation, Hungtington, W. Va. "HAYNES" is a federally registered trademark of alloys produced by Haynes International, Inc., Kokomo, Ind.

Compositions of the powder material 300 are the same, substantially the same, or different from those of the existing component 101. For example, in one embodiment, the composition of the powder material 300 includes one or more of the compositions discussed above with regard to the existing component 101. In another embodiment, the composition of the powder material 300 includes a tungsten carbide powder mixed with any one of the compositions discussed above with regard to the existing component 101. The addition of the tungsten carbide powder to the composition of the existing component 101 strengthens the article 200 formed from the resulting powder material 300. In a further embodiment, the powder material 300 includes a composition, by weight, of about 62% Co, about 29% Cr, about 7% Mo, about 0.88% Si, about 0.82% Mn, about 0.1% C, and a balance incidental impurities, while the existing component 101 includes a composition, by weight, of about 29% chromium (Cr), about 10% nickel (Ni), about 7% tungsten (W), about 1% iron (Fe), about 0.25% carbon (C), about 0.01% boron (B), and balance cobalt (Co) (e.g., FSX414).

Figure 5:
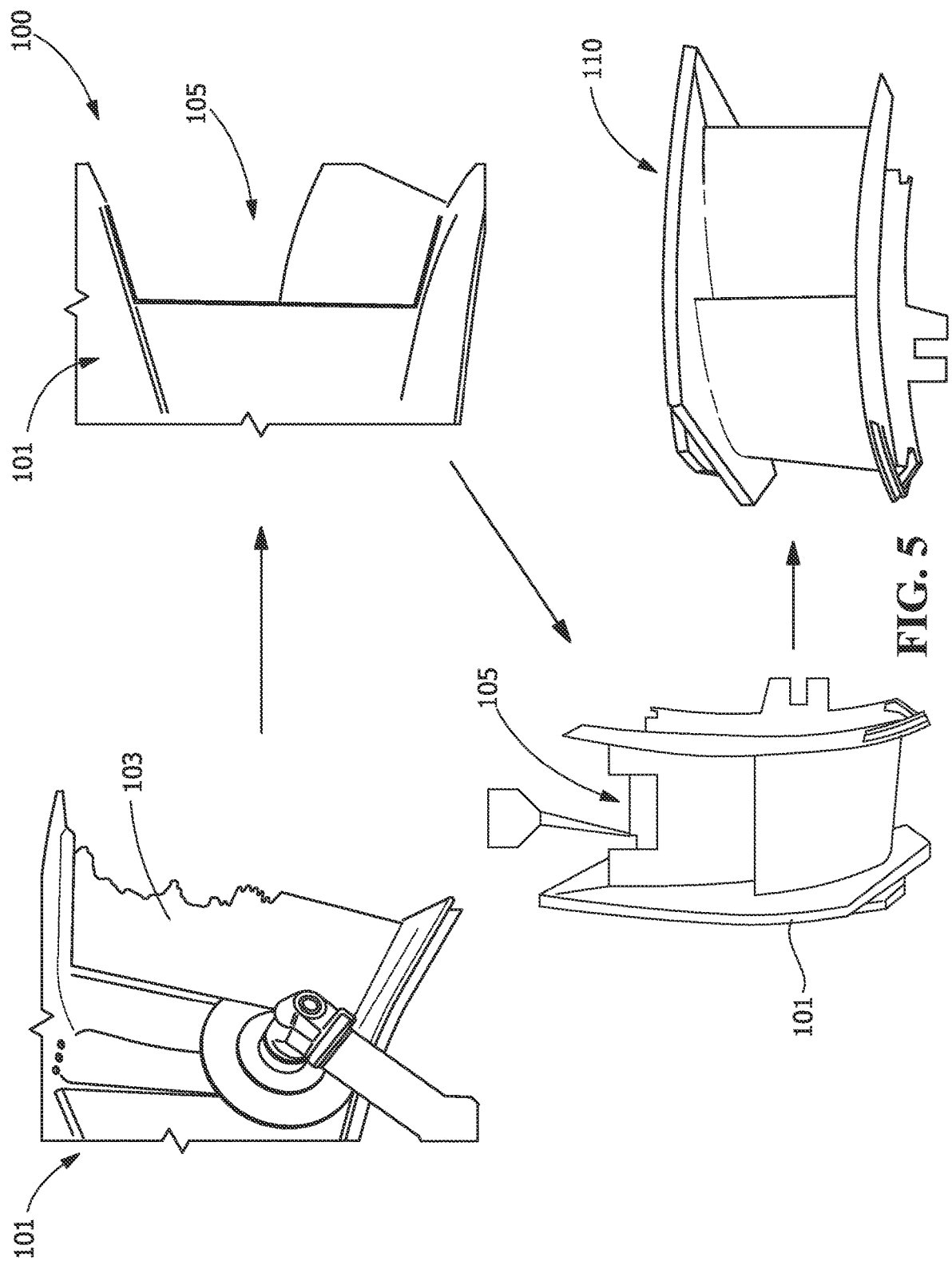
FIG. 5 is a process view of a method of forming a component, according to an embodiment of the disclosure.

Additionally or alternatively, as illustrated in FIGS. 5-6, the method 100 of forming the component 110 includes additive manufacturing directly onto the existing component 101. For example, in one embodiment, as illustrated in FIG. 5, the method 100 of forming the component 110 includes removing a portion 103 of the existing component 101 to form the open section 105 in the existing component 101, and then filling the open section 105 of the existing component 101 through additive manufacturing to form the component 110. In another embodiment, as illustrated in FIG. 6, the method 100 of forming a component 110 includes applying a material directly to a surface of the existing component 101 through additive manufacturing, the applying of the material forming the component 110. The surface of the existing component 101 may include one or more open sections 105, one or more areas of depleted thickness, and/or an irregular surface formed during use of the existing component 101.

The material deposited directly onto the existing component 101 through additive manufacturing includes any suitable desired shape and/or geometry. For example, the material deposited directly onto the existing component 101 may form the trailing edge portion 201 having the segment of an internal cavity 203, the shaped outer surface 205, and the at least one cooling hole 207 formed therein (see FIG. 2). The material applied directly to the existing component 101 includes any of the materials described above for forming the article 200.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a component, the component formed by an existing component and a formed article, the method of forming the component comprising:
   removing a portion of the existing component, the removing of the portion of the existing component includes forming an open section in the existing component;
   forming an article through an additive manufacturing technique, the article having a net shape and geometry arranged and disposed to fill the open section in the existing component, wherein the net shape and geometry fills the open section without article finishing, such as at least one of machining and grinding, following forming the article; and
   securing the article within the open section of the existing component to form the component formed by the existing component and the formed article.

2. The method of claim 1, wherein the component formed by the existing component and the formed article includes a turbine component.

3. The method of claim 2, wherein the turbine component includes a hot gas path component selected from the group of a blade, a shroud, a nozzle, and combinations thereof.

4. The method of claim 3, wherein the open section in the existing component is in a trailing edge of the turbine component.

5. The method of claim 1, wherein the additive manufacturing technique includes:
   positioning a nozzle relative to a platform;
   simultaneously passing a powder material and a laser through the nozzle, forming a gas atomized powder material exiting the nozzle;
   directing the gas atomized powder material from the nozzle towards the platform;
   depositing the gas atomized powder material on the platform; and
   moving at least one of the nozzle and the platform relative to each other during the depositing, the moving at least one of the nozzle and the platform forms the article.

6. The method of claim 5, wherein the powder material includes a metal alloy powder.

7. The method of claim 5, wherein the additive manufacturing technique includes:
   depositing the gas atomized powder material on the platform by distributing a first layer of the gas atomized powder material to a region of the platform;
   selectively laser melting the first layer;
   distributing at least one additional layer of the gas atomized powder material over the first layer;

selectively laser melting each the at least one additional layers; and forming the article having the shape and geometry arranged and disposed to fill the open section from the gas atomized powder material.

8. The method of claim 7, wherein the gas atomized powder material includes a metal alloy powder.

9. The method of claim 1, wherein the securing the article within the open section includes welding the article to the existing component.

10. The method of claim 1, wherein a material composition of the article differs from a material composition of the existing component.

11. The method of claim 1, further including heat treating the component formed by the existing component and the formed article.

* * * * *